May 5, 1959 J. PIGNONE 2,885,255
RECORDER PEN LIFT MECHANISM
Filed Nov. 23, 1956 3 Sheets-Sheet 1

JOSEPH PIGNONE
INVENTOR.

BY
Rudolph L. Lurick
ATTORNEY

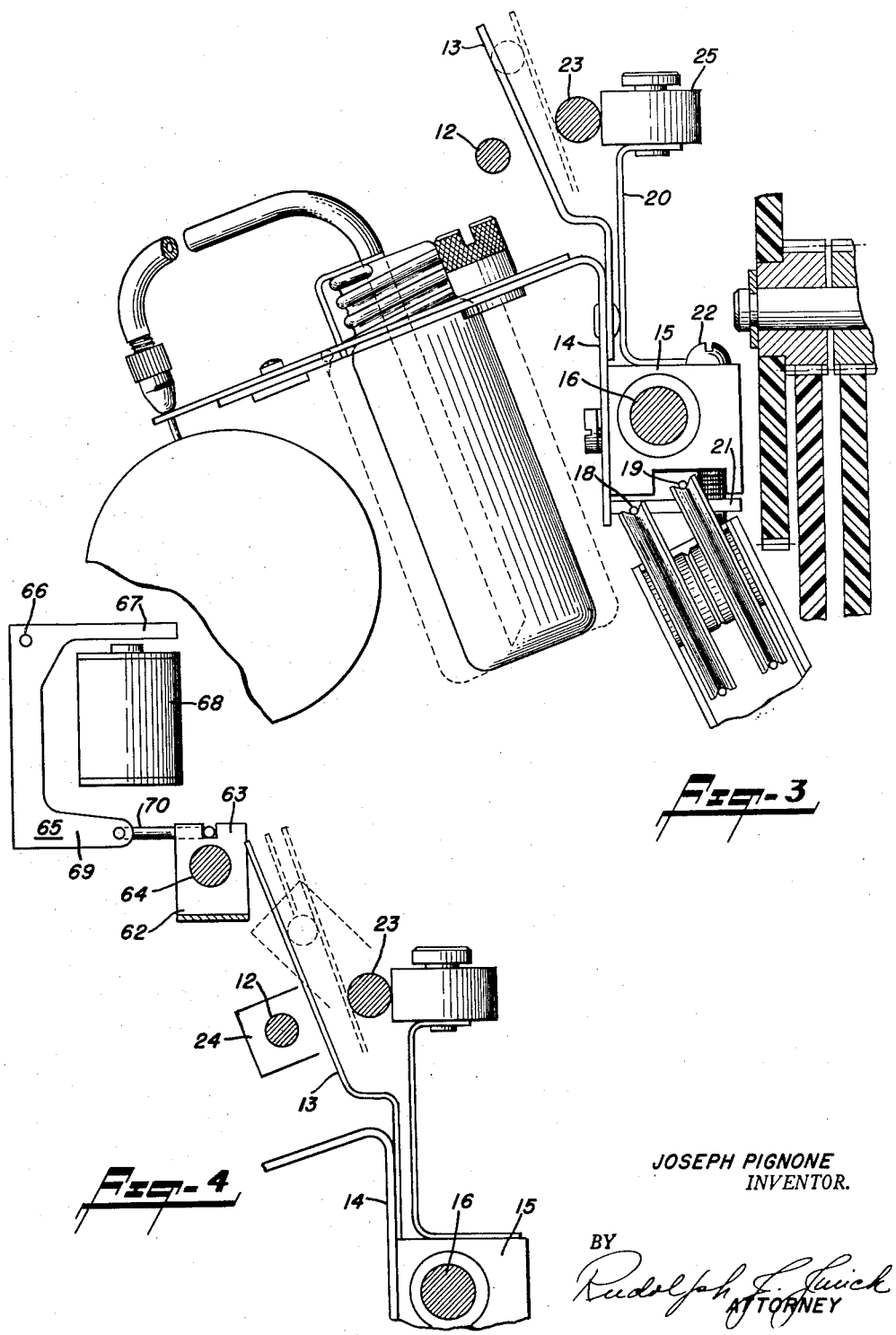

United States Patent Office 2,885,255
Patented May 5, 1959

2,885,255

RECORDER PEN LIFT MECHANISM

Joseph Pignone, West Orange, N.J., assignor, by mesne assignments, to Daystrom, Incorporated, Murray Hill, N.J., a corporation of New Jersey Application November 23, 1956, Serial No. 624,164

11 Claims. (Cl. 346—68)

This invention relates to improvements in automatic indicating and recording apparatus and, more particularly, to mechanism of novel construction for lifting the recorder pen off the chart.

Recorders of the type to which this invention relates are useful in providing a measurement and record for variable conditions such as temperatures. However, they are also designed to measure and record output from such primary elements as thermocouples, tachometer generators, photoelectric cells, resistance thermometer bulbs, and any transducer that provides an electrical output. Such recorders can also be employed to measure flow, pressure and weight by using suitable converters to provide an electrical output.

The indication and recording of the instantaneous state of a variable condition is usually accomplished by electrical networks which are adapted to be unbalanced by a variation in the condition and to effect an operation of a suitable rebalancing means. Such rebalancing operations include the actuation of suitable power means for simultaneously moving an inking pen or stylus over a power driven constantly-movable, calibrated chart. In present recorders the pen and associated components are of complicated, delicate and costly construction.

In accordance with my invention, it is proposed to provide a system of actuating linkages interrelated optionally to lift the recorder pen or pens off the chart surface for any of the several pen control functions common to the art. I provide an automatic lift coupled to the chart plate lock lever to lift the pen or pens completely off the chart paper on the timing roll while the chart plate is being unlatched, but before it is freed to swing open, the pen being restored automatically to recording position only after the chart plate is completely closed. I also provide a manual lift toggled to maintain the pen or pens in a lifted position. It is also proposed to provide an automatic solenoid or magnetic lift for the pen or pens.

An object of this invention is to provide means which automatically lifts the pen or pens off the chart as the chart plate is being unlatched but before it is freed to swing open.

An object of this invention is to provide a manual lift toggled to maintain the pen or pens in a lifted position and operable independently of the automatic lift.

An object of this invention is to provide automatic solenoid or magnetic means for lifting the pen or pens off the chart.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts of the several views:

Figure 3 is a fragmentary transverse sectional view on the line III—III of Figure 1 in the direction of the arrows;

Figure 4 is a fragmentary transverse sectional view, corresponding generally to Figure 3, but showing an automatic solenoid or magnetic lift for the pen or pens.

Figure 1:
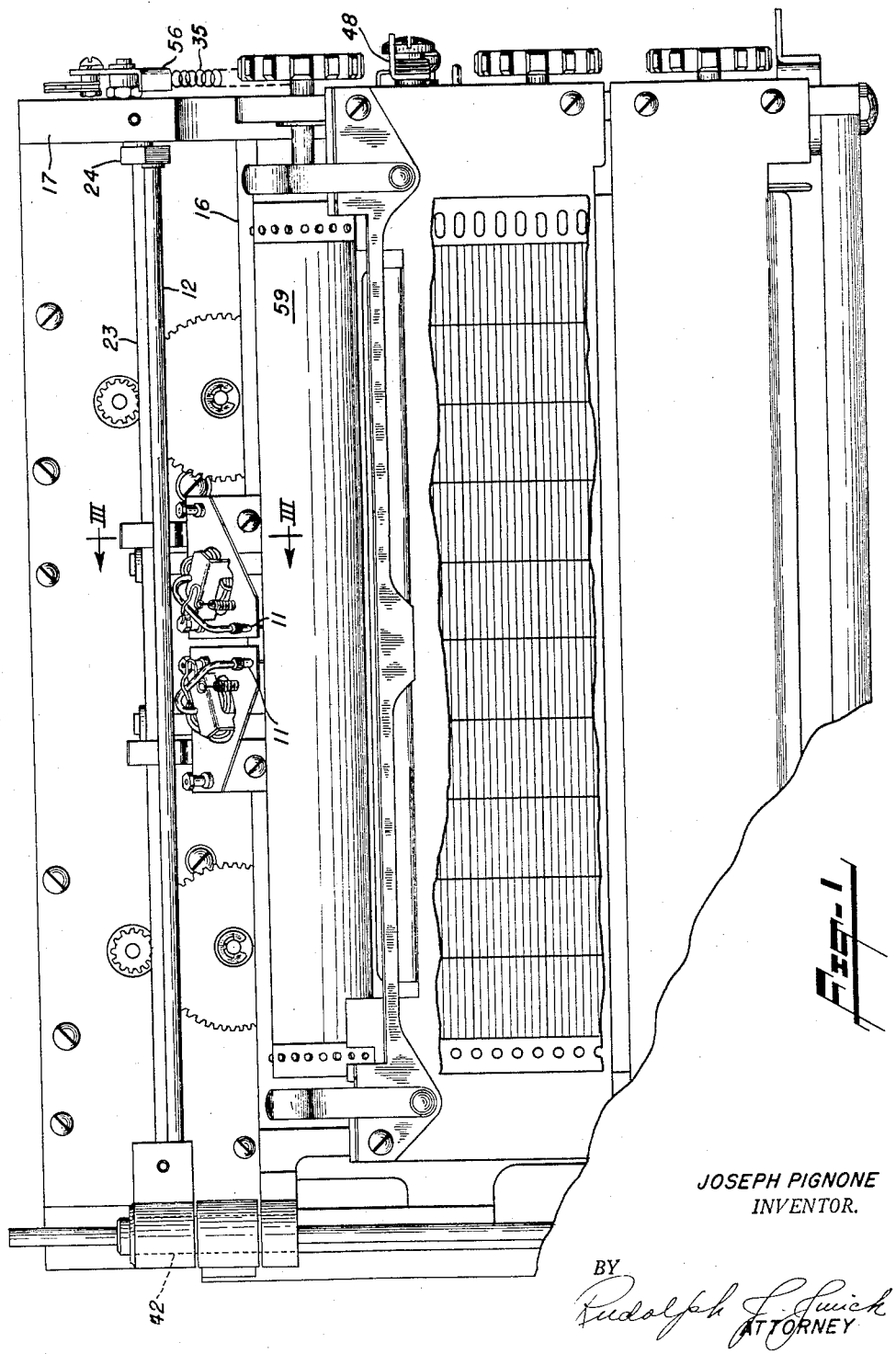
Figure 1 is a fragmentary front elevational view of indicating and recording apparatus embodying my invention.
Figure 2:
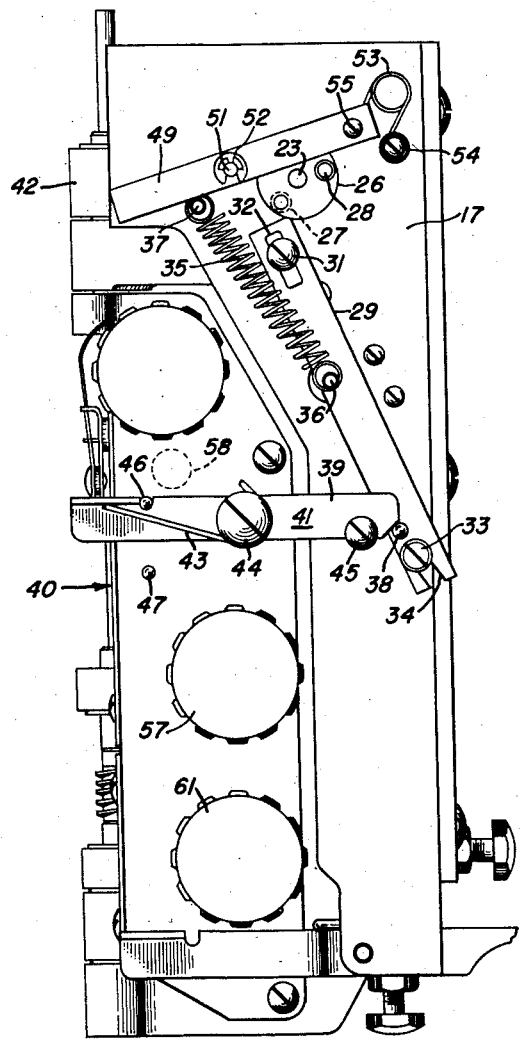
Figure 2 is a side elevational view of the apparatus of Figure 1.

Referring now to the drawings in detail, and first considering the embodiment of my invention illustrated in Figures 1, 2 and 3, there is shown a recording pen lift mechanism embodying my invention and incorporated in a two-pen two-zone recorder mechanism. The mechanism was designed originally for pen control of a recorder specifically intended for the severe field requirements of oil well probing, where extreme simplicity, ruggedness and immediate accessibility of the lift mechanism are mandatory. The present invention provides an improved basic structure to which supplemental controls or actuators can be added with ease.

Each recorder pen, generally designated 11 and preferably of the type including an ink-dispensing stylus, and made as described and claimed in detail in my co-pending application, Serial No. 618,993, filed October 29, 1956, now Patent No. 2,829,026, issued April 1, 1958, and entitled "Recorder Pen," is lifted by a bail, rod or bar 12, swinging about an operating shaft 23, and which engages an extended part or arm 13 of the pen carriage or stylus-holding means 14. A preferred construction of the pen carriage 14 is described and claimed in my co-pending application, Serial No. 625,075, filed November 29, 1956, and entitled "Recorder Pen Carriage." Each carriage 14 includes a preferably generally rectangular block or bearing member 15 which reciprocates and swivels on a circularly sectioned support and guiding track or rod 16, the ends of which are supported in the recorder frame 17 or end castings thereof. Mechanisms for moving the carriage or carriages 14, across the record and longitudinally along the support track 16, include cables 18 and 19 respectively clamped to the carriage blocks or bearings 15, as by means of clamping plates 21, one of which is illustrated in Figure 3, each held in place with respect to its bearing as by means of a screw or the like 22, as will be understood by those skilled in the art.

In the present embodiment there is an actuating or operating shaft 23 which is supported parallel to the guiding rod 16 and journaled at each end in the frame 17. Its right hand end portion, as viewed in Figure 1, extends through the right side casting member of the frame 17. Each bearing 15 carries a resilient arm 20 on which is journaled a roller 25 which rides on the operating shaft 23, counterbalancing the weight of the carriage, thereby assuring a desired pressure between the stylus and the chart, and normally determining the elevation of the carriage 14. An arm 24 is secured to each end portion of the shaft 23 inside the end frame members or castings. These arms, in turn, support the lift rod or bail 12 in a position parallel to the operating shaft 23. The end portion of the shaft 23, which extends beyond the right hand frame casting of the frame 17, has a disc member 26 secured thereto for the operation thereof. A pin 27 is carried on the inner face of the disc member, while a pin 28 extends from the outer face thereof. These pins serve as driving means for the disc 26 and, through it, the shaft 23, but are operated by different mechanisms as will now be described. When so operated they serve to lift the bail or rod 12 against gravity.

Mounted on the outer face of the side casting of the recorder frame 17 is lift plate or bar 29. This lift bar receives an upper carrying screw 31, secured to the frame 17, in an upper slotted portion 32 thereof, and a lower carrying screw 33, also secured to the frame, in a lower notched portion 34 thereof. By virtue of this mounting, the lift bar is slidable diagonally upward and forward or diagonally downward and rearward, within the limits provided by the slot 32 and notch 34. It is, however, normally held in its upper position by means of a coiled tension spring 35, one end of which is attached to a stud 36 outstanding from the lift bar 29, and the other end of which is attached to a stud 37, outstanding from the side of the frame 17. The upper end of the lift bar 29, therefore, underlies the lower portion of the disc 26 and engages the inner pin 27, thereby limiting counter-clockwise rotation of such disc and establishing the normal altitude of the bail 12.

Movement of the lift bar 29 upwardly by the tension spring 35 is normally restrained by reason of the pin or stud 38 projecting from said bar and contacting the hook-end portion 39 of latch bar or latch 41. This latch bar serves to hold the chart plate assembly 40, which is pivotally mounted on hinge pins, one of which is indicated at 42. Latch spring 43, which is fulcrumed around latch mounting screw or stud 44, urges the latch clockwise, as by having one end portion pressing on the undersurface of outer angular or shelf portion 48 and the other end portion received in an aperture in the frame, to hold its hooked end portion 39 in engagement with the stud 45 when the chart plate assembly 40 is closed as viewed in Figures 1 and 2. When said assembly is open, clockwise movement is limited by engagement with a pin 46 outstanding from the frame 17. Counter-clockwise movement to unlatching position is limited by engagement with pin 47 outstanding from the frame 17.

The force of the stronger spring 43 overcomes that of the lighter spring 35 and normally retains the lift bar in the position shown. Manual actuation, causing counter-clockwise movement of the latch bar 41, as by applying pressure against the outer shaft portion 48 thereof, unlocks the chart plate assembly, at the same time releasing the pressure against the pin or stud 38, and permits the spring 35 to draw the bar 29 upwardly against the disc pin 27. As a result, the disc 26 is rotated in a clockwise direction, causing the bar or bail 12 to contact and move the extended part 13 to lift the pen carriage or carriages 14.

Since movement of the lift bar 29 is normally stopped by its engagement with the latch bar 41, the disc 26 obviously is free to be rotated independently in a clockwise or lifting direction. I have provided for that purpose a manual lift lever 49 fulcrumed or journaled on a stud 51 extending from the frame 17, and prevented from undesired removal therefrom as by means of a spring lock washer 52. This lift lever 29 is snap-activated by a tumbler spring 53, swinging around stud screw 54 which secures it to the frame 17, and connected to the rearward end portion of the lever 49 as by means of screw 55. Clockwise movement of the manual lift lever, as by raising the outer angular end portion 56, causes the disc 26 and the connected bail rod 12 to be rotated by reason of the downward thrust on the outer disc pin 28. The pen stylus and its carriage 14 are thus maintained in a lifted position because of the displaced direction of force of the tumbler spring 53.

It will be understood that when the recorder is in operation, chart paper is, by suitable power means, unrolled about the axis of the chart roll knob 57 from a supply roll, and is drawn upwards around a tie rod 58 by the chart timing roll 59, under the styluses of the pens 11, from whence it is drawn downwardly and re-rolled about the axis of the knob 61.

Referring now to the embodiment of my invention illustrated in the Figure 4 modification there is provided operating means, in addition to the parts of the first embodiment, including the guiding track or rod 16, on which the bearing 15 rides, the operating shaft 23, and the bail rod 12 carried on arms 24 thereof for engaging the carriage extension 13. These additional operating means include a preferably relatively light bail 62, which may be formed from flat stock but to generally U-shape. The arms 63 of this bail are swingably carried by a frame-supported rod 64.

A bell-crank lever 65 is pivoted to the frame, as indicated at 66. One arm 67 of this lever forms the armature of a suitably supported electromagnet or solenoid 68. The other arm 69 of said lever is flexibly connected, as by means of a link 70 to one of the arms 63 of said bail 62. Energization of the electromagnet 68 thus effects counter-clockwise turning of the bail 62, and consequent movement of the extension 13, from the full to the fragmentary dotted line position thereof, to effect some raising of the carriage 14. It will, however, be seen that such raising need not be as much as that effected by the bail rod 12, which may move the extension therebeyond to the extreme right hand dotted-line position.

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In a recorder of the type including a frame, an inking stylus, a plate unit carrying a chart roll, pivoted to said frame and manually-movable into and from operative position with respect to the stylus, and means for unrolling the chart, whereby the stylus will draw a record on the chart surface during such periods when the chart roll is in operative position, the combination of means for holding said stylus, means supported by said frame for guiding said stylus-holding means for longitudinal and rotary movement, a shaft supported by said frame generally parallel to said guiding means, a bail swingable by and about said shaft, means extending from the stylus-holding means into the path of movement of said bail so as to be raised therewith, a driving member attached to one end of said shaft, a lift bar slidably mounted on the frame and normally forming a stop for said driving member to thereby establish the normal altitude of the bail, a spring tending to hold the lift bar in driving-member-limiting position, means for holding the plate unit shut with respect to the frame, means on the frame engageable by the plate unit holding means, a spring to urge said plate unit holding means into operative position, said spring being stronger than the lift bar spring, and means projecting from the lift bar and normally engaged by the plate unit holding means to overcome the action of the lift bar spring and maintain the lift bar in inoperative position.

2. In a recorder of the type including a frame, an inking stylus, a plate unit carrying a chart roll, pivoted to said frame and manually-movable into and from operative position with respect to the stylus, and power means for unrolling the chart, whereby the stylus will draw a record on the chart surface during such periods when the chart roll is in operative position, the combination of a bearing member, a rod supported by said frame for guiding said bearing member for longitudinal and rotary movement, means carried by said bearing member for holding said stylus, a shaft supported parallel to said rod by said frame, a bail swingable by and about said shaft, means extending from the stylus-holding means into the path of movement of said bail so as to be raised therewith, a disc member attached to one end of said shaft for driving the same, a lift bar slidably mounted on the frame and normally forming a stop for said disc member to thereby establish the normal altitude of the bail, a spring tending to hold the lift bar in a position to limit movement of the disc member, a latch pivotally mounted on the plate unit, a stud on the frame over which the latch hooks to hold shut the plate unit, a pin on said plate unit around which said latch is pivoted, a spring acting to urge said latch into engagement with said frame stud to hold the plate unit in closed position, said spring being stronger than the lift bar spring, and means projecting from the lift bar and normally engaged by the inner end of said latch to overcome the action of the lift bar spring and maintain the lift bar in inoperative position.

3. In a recorder of the type including a frame, an inking stylus, a plate unit carrying a chart roll, pivoted to said frame and manually-movable into and from operative position with respect to the stylus, and power means for unrolling the chart, whereby the stylus will draw a record on the chart surface during such periods when the chart roll is in operative position, the combination of a generally rectangular bearing member, a rod supported by said frame for guiding said bearing member for longitudinal and rotary movement, means carried by said bearing member for holding said stylus, a shaft supported parallel to said rod by said frame, an arm with its inner end secured to each end portion of said shaft, a lift rod supported by the other end portions of said arms so as to be swingable about said shaft, means extending from the stylus-holding means into the path of movement of said lift rod so as to be raised therewith, a disc member attached to one end of said shaft for driving the same, a pin carried on said disc member, a lift bar slidably mounted on the frame, the upper end of said lift bar limiting counterclockwise rotation of the disc by forming a stop for said pin to thereby establish the normal altitude of the lift rod, a tension spring acting upwardly on the lift bar, a latch pivotally mounted on the plate unit, a stud on the frame over which the latch hooks to hold shut the plate unit, a fulcrum pin on said plate unit around which said latch is pivoted, a latch spring mounted on said fulcrum pin and acting to urge said latch into engagement with said frame stud to hold the plate unit in closed position, the latch bar spring being stronger than the lift bar spring, a pin projecting from the lift bar and normally engaged by the inner end of said latch to overcome the action of the tension spring and maintain the lift bar in inoperative position, whereby manual actuation of the latch to raise its inner end to unlatching position releases the pin on said lift bar and allows the latter to move the said disc pin, rotate the disc, and raise the lift rod.

4. In a recorder of the type including a frame, an inking stylus, a plate unit carrying a chart roll, pivoted to said frame and manually-movable into and from operative position with respect to the stylus, and power means for unrolling the chart, whereby the stylus will draw a record on the chart surface during such periods when the chart roll is in operative position, the combination of a bearing member, means supported by said frame for guiding said bearing member for longitudinal and rotary movement, means carried by said bearing member for holding said stylus, a shaft supported by said frame generally parallel to said rod guiding means, a bail swingable by and about said shaft, means extending from the stylus-holding means into the path of movement of said bail so as to be raised therewith, a driving member attached to one end of said shaft, a manual lift lever fulcrumed on the frame, an abutment on the frame, resilient means extending between said lift lever and said abutment, the path of movement of said lift lever being such that upon raising its outer end the resilient means has direction of force displaced to cause said lift lever to act on the driving member and its attached shaft to thereby move to and maintain the bail and the stylus-holding means actuated thereby in raised position.

5. In a recorder of the type including a frame, an inking stylus, a plate unit carrying a chart roll, pivoted to said frame and manually-movable into and from operative position with respect to the stylus, and power means for unrolling the chart, whereby the stylus will draw a record on the chart surface during such periods when the chart roll is in operative position, the combination of a bearing member, a rod supported by said frame for guiding said bearing member for longitudinal and rotary movement, means carried by said bearing member for holding said stylus, a shaft supported parallel to said rod by said frame, a bail swingable by and about said shaft, means extending from the stylus-holding means into the path of movement of said bail so as to be raised therewith, a disc member attached to one end of said shaft for driving the same, a manual lift lever fulcrumed on the frame, a stud screw on the frame, a tumbler spring extending between said lift lever and said screw, the path of movement of said lift lever being such that upon raising its outer end the tumbler spring has its direction of force displaced to cause said lift lever to exert a turning force on the disc member to rotate it and its attached shaft, to thereby move to and maintain the bail and the stylus-holding means actuated thereby in raised position.

6. In a recorder of the type including a frame, an inking stylus, a plate unit carrying a chart roll, pivoted to said frame and manually-movable into and from operative position with respect to the stylus, and power means for unrolling the chart, whereby the stylus will draw a record on the chart surface during such periods when the chart roll is in operative position, the combination of a generally rectangular bearing member, a rod supported by said frame for guiding said bearing member for longitudinal and rotary movement, means carried by said bearing member for holding said stylus, a shaft supported parallel to said rod by said frame, an arm with its inner end secured to each end portion of said shaft, a lift rod supported by the other end portions of said arms so as to be swingable about said shaft, means extending from the stylus-holding means into the path of movement of said lift rod so as to be raised therewith, a disc member attached to one end of said shaft for driving the same, a pin carried on said disc member, a manual lift lever fulcrumed on the frame, a stud screw on the frame, a tumbler spring extending between the rear end of said lift lever and said screw, the path of movement of said lift lever being such that upon raising its outer end the tumbler spring has its direction of force displaced to cause said lift lever to exert a downward thrust on the disc pin to rotate the disc and its attached shaft, to thereby move to and maintain the lift rod and the stylus-holding means actuated thereby in raised position.

7. In a recorder of the type including a frame, an inking stylus, a plate unit carrying a chart roll, pivoted to said frame and manually-movable into and from operative position with respect to the stylus, and means for unrolling the chart, whereby the stylus will draw a record on the chart surface during such periods when the chart roll is in operative position, the combination of a bearing member, means supported by said frame for guiding said bearing member for longitudinal and rotary movement, means carried by said bearing member for holding said stylus, a shaft supported by said frame generally parallel to said guiding means, a bail swingable by and about said shaft, means extending from the stylus-holding means into the path of movement of said bail so as to be raised therewith, and electromagnetic means connected to said bail for, upon energization thereof, rotating it about said shaft, moving it into engagement with the means extending from the stylus-holding means, and thereby raise said stylus.

8. In a recorder of the type including a frame, an inking stylus, a plate unit carrying a chart roll, pivoted to said frame and manually-movable into and from operative position with respect to the stylus, and power means for unrolling the chart whereby the stylus will draw a record on the chart surface during such periods when the chart roll is in operative position, the combination of a generally rectangular bearing member, a rod supported by said frame for guiding said bearing member for longitudinal and rotary movement, means carried by said bearing member for holding said stylus, a shaft supported parallel to said rod by said frame, a bail swingable by and about said shaft, means extending from the stylus-holding means into the path of movement of said bail so as to be raised therewith, a disc member attached to one end of said shaft for driving the same, and means actuated upon opening said plate unit for rotating the disc member to raise the bail.

9. In a recorder of the type including a frame, an inking stylus, a plate unit carrying a chart roll, pivoted to said frame and manually-movable into and from operative position with respect to the stylus, and power means for unrolling the chart whereby the stylus will draw a record on the chart surface during such periods when the chart roll is in operative position, the combination of a generally rectangular bearing member, a rod supported by said frame for guiding said bearing member for longitudinal and rotary movement, means carried by said bearing member for holding said stylus, a shaft supported parallel to said rod by said frame, a bail swingable by and about said shaft, means extending from the stylus-holding means into the path of movement of said bail so as to be raised therewith, a disc member attached to one end of said shaft for driving the same, a manual lift lever fulcrumed on the frame, and means whereby upon moving said lift lever said disc member is rotated and the bail raised.

10. In a recorder of the type including a frame, an inking stylus, a plate unit carrying a chart roll, pivoted to said frame and manually-movable into and from operative position with respect to the stylus, and power means for unrolling the chart whereby the stylus will draw a record on the chart surface during such periods when the chart roll is in operative position, the combination of a generally rectangular bearing member, a rod supported by said frame for guiding said bearing member for longitudinal and rotary movement, means carried by said bearing member for holding said stylus, a shaft supported parallel to said rod by said frame, an arm with its inner end secured to each end portion of said shaft, a lift rod supported by the other end portions of said arms so as to be swingable about said shaft, means extending from the stylus-holding means into the path of movement of said lift rod so as to be raised therewith, a disc member attached to one end of said shaft for driving the same, an inner pin carried on said disc member, means actuated upon opening said plate unit for acting on said pin to rotate the disc member and raise the lift rod, an outer pin carried by said disc member, a manual lift lever fulcrumed on the frame, and means whereby upon raising the outer end of said manual lift lever the outer pin of said disc member is engaged, the disc rotated and the lift rod raised independently of movement of said plate unit.

11. In a recorder of the type including a frame, an inking stylus, a plate unit carrying a chart roll, pivoted to said frame and manually movable into and from operative position with respect to the stylus and power means for unrolling the chart whereby the stylus will draw a record on the chart surface during such periods when the chart roll is in operative position, the combination of a generally rectangular bearing member, a rod supported by said frame for guiding said bearing member for longitudinal and rotary movement, means carried by said bearing member for holding said stylus, a shaft supported parallel to said rod by said frame, an arm with its inner end secured to each end portion of said shaft, a lift rod supported by the other end portions of said arms so as to be swingable about said shaft, means extending from the means for holding the stylus into the path of movement of said lift rod so as to be raised therewith, a disc member attached to one end of said shaft for driving the same, an inner pin carried on said disc member, an outer pin carried on said disc member, a lift bar slidably mounted on the frame, the upper end of said lift bar limiting counterclockwise rotation of the disc by forming a stop for the inner pin, to thereby establish the normal altitude of the lift rod, a tension spring acting between the lift bar and the frame to draw the former upwardly, a latch pivotally mounted on the plate unit, a stud on the frame over which said latch hooks to hold shut the plate unit, a fulcrum pin on said plate unit around which said latch is pivoted, a latch spring mounted on said fulcrum pin and acting to urge said latch into engagement with said frame stud to hold the plate unit in closed position, the latch spring being stronger than the lift rod spring, a pin projecting from the lift bar and normally engaged by the inner end portion of said latch to overcome the action of the tension spring and maintain the lift bar in lower position, whereby manual actuation of the latch to raise its inner end to unlatching position releases the pin on said lift bar and allows the latter to move the inner disc pin, rotate the disc, and raise the lift rod, means being also provided to effect such operation independently of movement of the latch, comprising a manual lift lever fulcrumed on the frame, a stud screw on the frame, a tumbler spring extending between the rear end of said lift lever and said screw, the path of movement of said lift lever being such that upon raising its outer end, the tumbler spring has its direction of force displaced to cause said lift lever to exert a downward thrust on the outer disc pin to rotate the disc and its attached shaft, to thereby move to, and maintain the lift rod and the stylus-holding means actuated thereby, in raised position.

References Cited in the file of this patent

UNITED STATES PATENTS

| 1,909,310 | Ohmer et al. | May 16, 1933 |
| 2,074,118 | Ross et al. | Mar. 16, 1937 |
| 2,424,118 | Rast | July 15, 1947 |
| 2,510,575 | Hathaway | June 6, 1950 |
| 2,694,615 | Clements | Nov. 16, 1954 |